(12) United States Patent
Storti et al.

(10) Patent No.: US 12,227,125 B1
(45) Date of Patent: Feb. 18, 2025

(54) LOGO LAMP MODULE, EXTERNAL REAR VIEW ASSEMBLY AND MOTOR VEHICLE

(71) Applicant: MOTHERSON INNOVATIONS COMPANY LIMITED, London (GB)

(72) Inventors: Dylan Storti, Stuttgart (DE); Dean Stevens, Lonsdale (AU); Peter Brown, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/783,583

(22) Filed: Jul. 25, 2024

(30) Foreign Application Priority Data

Aug. 15, 2023 (DE) ...................... 10 2023 121 787.9

(51) Int. Cl.
*B60Q 1/26* (2006.01)
*F21S 43/20* (2018.01)
(Continued)

(52) U.S. Cl.
CPC ...... *B60Q 1/2665* (2013.01); *F21S 43/26411* (2024.05); *F21S 43/27* (2018.01);
(Continued)

(58) Field of Classification Search
CPC ............... B60Q 1/2665; B60Q 2400/50; F21S 43/26411–27; F21V 5/04;
(Continued)

(56) References Cited

U.S. PATENT DOCUMENTS

| | | |
|---|---|---|
| 2019/0111847 A1 | 4/2019 | Messenger et al. |
| 2020/0114825 A1 | 4/2020 | Messenger et al. |
| 2020/0166191 A1* | 5/2020 | Kim ...................... B60Q 1/323 |

FOREIGN PATENT DOCUMENTS

| | | |
|---|---|---|
| DE | 19805771 | 8/1999 |
| DE | 11 2017 006 014 | 9/2019 |

OTHER PUBLICATIONS

German Patent Office, Appl. 10 2023 121 787.9, Office Action, Feb. 28, 2024.
(Continued)

*Primary Examiner* — Jason M Han
(74) *Attorney, Agent, or Firm* — Jones Day

(57) ABSTRACT

The present disclosure relates to a logo lamp module for an external rear view assembly of a motor vehicle comprising a projection optics lens stack arranged within a stack holding portion of a housing closed by a printed circuit board, wherein the projection optics lens stack comprises a logo sheet or image substrate between at least one first lens and at least one second lens, with the at least one first lens being arranged between the printed circuit board and the logo sheet or image substrate, and the at least one second lens being arranged between the logo sheet or image substrate and a light exiting portion of the housing. The logo lamp module further comprises a flow path which is provided by a hole through the printed circuit board and a funnel added to the at least one first lens such that a resin or adhesive applied on the outer surface of the printed circuit board contacts the surface of the logo sheet or image substrate facing the at least one first lens to seal the connection of the printed circuit board and the housing as well as to fix the logo sheet or image substrate within the housing. In addition, the present disclosure relates an external rear view assembly with such a logo lamp module and a motor vehicle with such an external rear view assembly.

14 Claims, 2 Drawing Sheets

(51) Int. Cl.
     *F21S 43/27*          (2018.01)
     *F21V 5/04*           (2006.01)
     *F21V 17/10*         (2006.01)
     *F21W 103/60*       (2018.01)

(52) U.S. Cl.
     CPC .............. *F21V 5/04* (2013.01); *F21V 17/101* (2013.01); *B60Q 2400/50* (2013.01); *F21W 2103/60* (2018.01)

(58) Field of Classification Search
     CPC ....... F21V 17/10–101; F21W 2103/25; F21W 2103/60
     See application file for complete search history.

(56) References Cited

OTHER PUBLICATIONS

German Patent Office, Appl. 10 2023 121 787.9, Grant Decision, Jun. 6, 2024.

\* cited by examiner

LOGO LAMP MODULE, EXTERNAL REAR VIEW ASSEMBLY AND MOTOR VEHICLE

CROSS-REFERENCE TO RELATED APPLICATION

This application claims priority to German Patent Application No. DE 10 2023 121 787.9, filed on Aug. 15, 2023, the entirety of which is incorporated by reference herein.

FIELD

The present disclosure relates to a logo lamp module for an external rear view assembly of a motor vehicle, an external rear view assembly with such a logo lamp module and a motor vehicle with such an external rear view assembly. The logo lamp module comprises a projection optics lens stack arranged within a stack holding portion of a housing closed by a printed circuit board, wherein the projection optics lens stack comprises a logo sheet or image substrate between at least one first lens and at least one second lens, with the at least one first lens being arranged between the printed circuit board and the logo sheet or image substrate, and the at least one second lens being arranged between the logo sheet or image substrate and a light exiting portion of the housing.

BACKGROUND

An external rear view assembly for a motor vehicle comprises at least one reflective element such as a mirror, and/or a camera in cooperation with a display, with the display being arranged within the external rear view assembly attached at a side of the motor vehicle or within the motor vehicle. A conventional rear view side mirror and a camera pod are examples of external rear view assemblies.

A rear view assembly for a motor vehicle offers a view of the area behind the motor vehicle at least in compliance with the legal provisions and belongs to a sub-group of assemblies for an indirect view. Different functions and devices can be built into rear view assemblies and/or controlled with the help of rear view assemblies. Light modules may be integrated into rear view assemblies.

A logo lamp module is disclosed in US 2019/111847 A1, which includes a housing having a top, a bottom, a left side, a right side, a front, and a back, a cap covering the top of the housing or preferably an encapsulant, one or more clips formed integrally with or attached to the housing, a connector receiving portion including an opening formed at the back of the housing, a printed circuit board fully enclosed within the housing, a light source connected to the printed circuit board and enclosed within the housing, and an optical assembly including at least one optical element for receiving light projected by the light source.

US 2020/0114825 A1 describes a logo lamp module, which comprises at least three optical components in form of a first lens, a logo sheet or image substrate, and a second lens within a housing having a light exiting portion. The first lens is mounted on a printed circuit board with the light source being arranged between the first lens and the printed circuit board, and the first lens supports the logo sheet and the second lens, wherein the second lens comprises a projection surface that engages the light exiting portion of the housing. Thus, the known three optical components are arranged as a stack.

When designing logo lamp lens stacks it is generally a stack of lenses that are placed on top of each other. When these are hand assembled, friction fits can be used to prevent rattling of the lenses and image substrate when the logo lamp module is exposed to shock or vibration. In the case of automated assembly, it is preferred to have clearance between all stack components to prevent jamming and allow the fastest possible assembly time. Furthermore, if a friction fit is not possible an extra component like a cover, a screw, or a welding process is generally required to hold the lens stack and the printed circuit board to the housing. This is due to two main factors; a.) when multiple economically moulded plastic lenses are stacked their variation in size is significant and b.) simple lens components of a stack are rigid. These factors prevent a simple snap fit of parts into the housing as it would result in a rattle or put significant strain on the printed circuit board due to the size variation. The amount of residual force possible would also be limited given the size variation. For the logo lamp image substrate, if it is glass, a friction fit is particularly troublesome due to its brittleness—particularly when the glass shape is simplified to a quadrilateral to minimize cost. If the lens stack is self-retained, where the lenses snap fit to each other, this is not as well suited to high-speed automated assembly as the orientation of each lens is more restricted and a top-down single piece assembly is less possible. Clipping features to hold the image substrate in place cannot be used when the packaging space is not available for them or cycle time constraints do not allow for an additional clipping process.

There is thus a need to further develop the known logo lamp module for an external rear view assembly of a motor vehicle to overcome the drawbacks of the prior art. In particular it is an object of the present disclosure to eliminate movement and rattle of the logo sheet or image substrate of the known logo lamp module.

SUMMARY

According to embodiments of the present disclosure, a logo lamp module comprises a flow path which is provided by a hole through the printed circuit board and a funnel added to at least one first lens such that a resin or adhesive applied on the outer surface of the printed circuit board contacts the surface of the logo sheet or image substrate facing the at least one first lens to seal the connection of the printed circuit board and the housing as well as to fix the logo sheet or image substrate within the housing.

According to an embodiment the housing comprises first attachment means for attachment to the external rear view assembly, second attachment means for attachment of the printed circuit board, and third attachment means for attachment of the projection optics lens stack.

The third attachment means may comprise first third attachment means for engaging the logo sheet or image substrate and/or the at least one second lens, with the first third attachment means preferably being provided by the stack holding portion, and/or second third attachment means for engaging the at least one second lens, with the second third attachment means preferably being provided by the light exiting portion.

Further, the light exiting portion may comprise a disk like lens portion, and a stem portion extending from the disk like lens portion, with the stem portion being comprised by the second third attachment means.

It is also proposed that the printed circuit board comprises a power connector and an electronic circuit, and/or the at least one light source is mounted on the printed circuit board, and/or the at least one first lens is mounted on the printed circuit board, preferably encasing the light source.

According to an embodiment the at least one first lens engages the logo sheet or image substrate, and/or the at least one first lens comprises a condenser lens.

According to another embodiment the at least one second lens engages the housing, in particular the light exiting portion and/or the stack holding portion, and/or the at least one second lens comprises a projector lens.

It is proposed that the hole is arranged in an edge portion of the printed circuit board, and the funnel is arranged in an edge portion of the at least one first lens, wherein the hole and the funnel are aligned to each other and/or are arranged in the region of engagement of the printed circuit board and the at least one first lens.

The flow path may be offset relative to the light exiting portion, in particular the disk like lens portion, and/or the flow path is dimensioned to draw the resin or adhesive via gravity and capillary action to make contact with the logo sheet or image substrate.

Further, it is proposed that the resin or adhesive is selected to comprise a polyurethane resin and/or to have a thixotropic character.

The present disclosure also provides an external rear view assembly for a motor vehicle with the logo lamp module according to present disclosure, and a motor vehicle comprising said external rear view assembly.

Thus, the present disclosure teaches the use of a resin or adhesive that seals the logo lamp module and fixes the image substrate in place. To do this without introducing additional assembly processes or cycle time, a defined flow path is provided for the resin or adhesive to ensure that is can pass through the printed circuit board as well as the first lens such that it can touch the image substrate. This defined flow path is needed as a typical logo lamp module does not allow the resin or adhesive to flow around and/or through the printed circuit board for sealing the lamp, whereas the image substrate is arranged beneath the printed circuit board and held between the lens of the stack of optical components. According to the present disclosure, this defined flow path is achieved by adding a hole in the printed circuit board and a funnel on the first lens to ensure the potting can touch the image substrate without completely filling the housing of the logo lamp module.

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of modules consistent with the present disclosure and, together with the detailed description, serve to explain advantages and principles consistent with the present disclosure, wherein:

DETAILED DESCRIPTION

Figure 1:
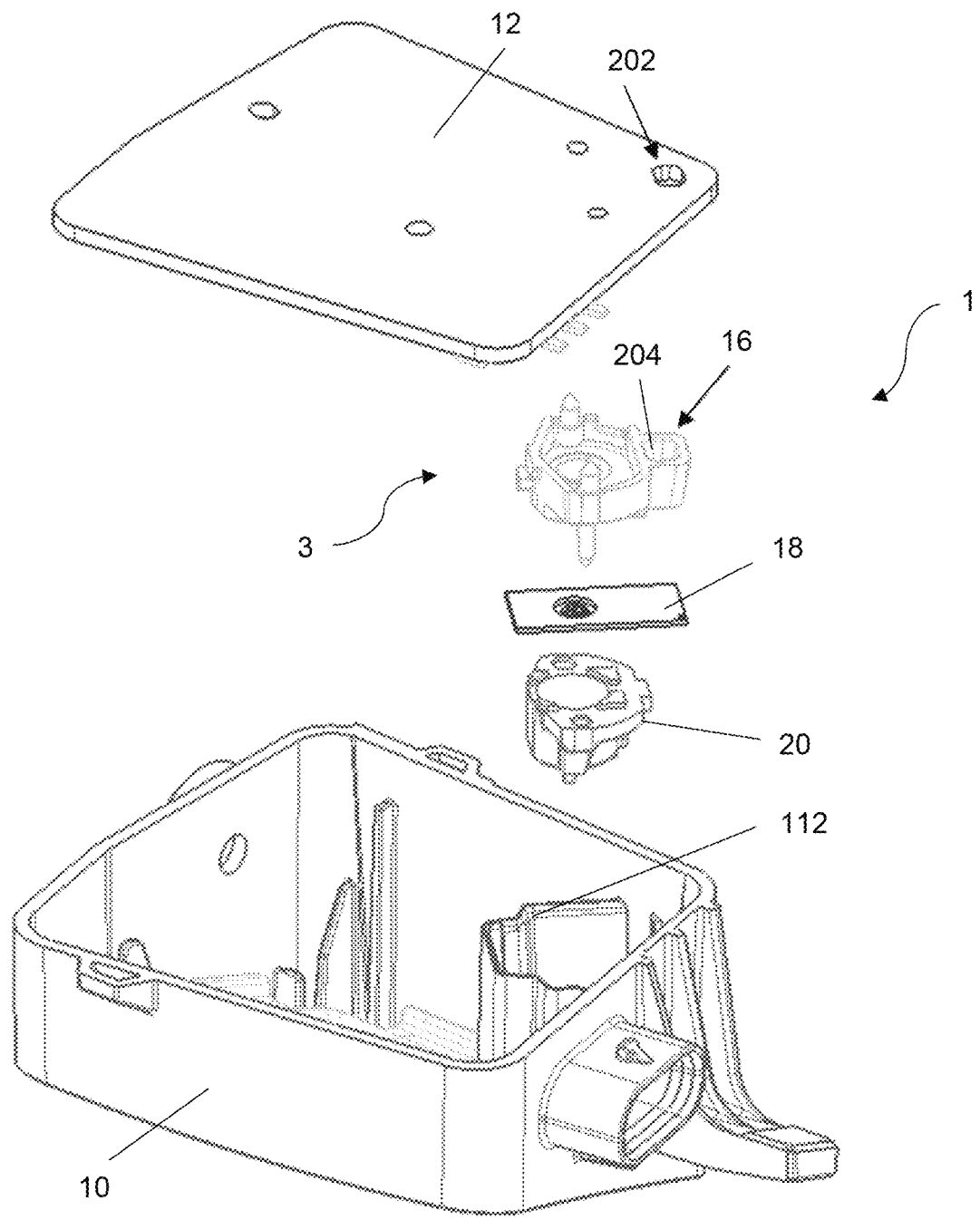
FIG. 1 is an exploded logo lamp module according to an embodiment.

In the following description, like reference characters designate like or corresponding parts throughout the figures.

The following detailed description is provided to assist the reader in gaining a comprehensive understanding of the modules and assemblies described herein. Accordingly, various changes, modifications, and equivalents will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Referring now to FIG. 1, there is shown a logo lamp module 1 for an external rear view assembly of a motor vehicle according to the present disclosure. The logo lamp module 1 comprises a projection optics lens stack 3 to be arranged within a stack holding portion 112 of a housing 10 with a printed circuit board 12 acting as a cap on the top. The projection optics lens stack 3 comprises a condenser lens 16, an image substrate 18 and a projector lens 20 between the printed circuit board 12 and a light exiting portion 110 from the top to the bottom.

Figure 2:
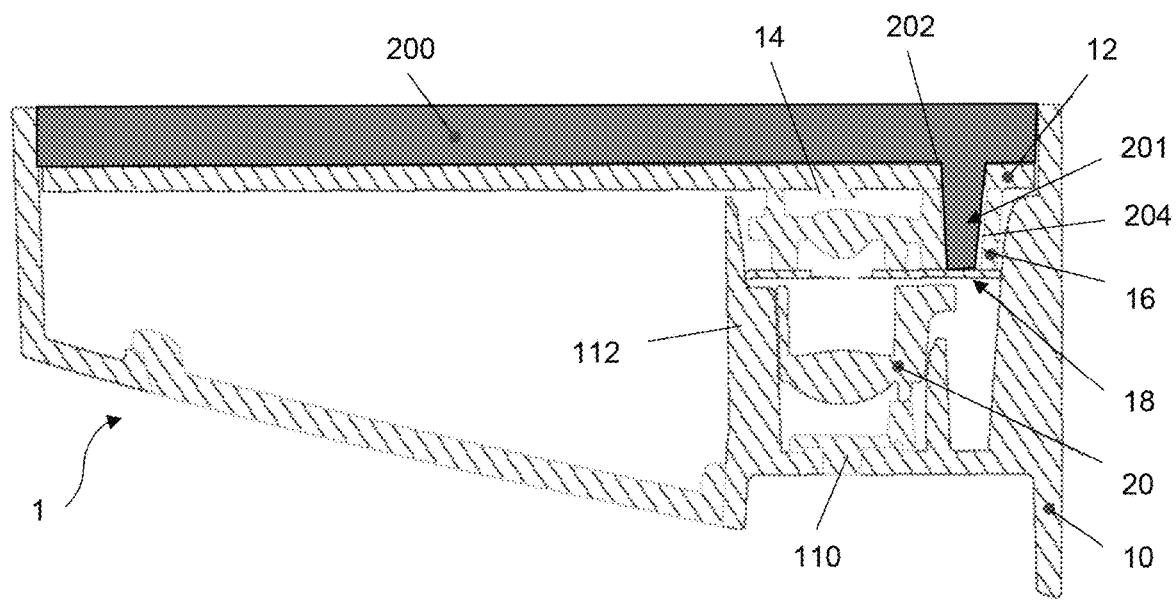
FIG. 2 is a section view of FIG. 1.

FIG. 2 shows the assembled logo lamp module 1 in a sectional view. Accordingly, a light source 14 is provided on a bottom surface of the printed circuit board 12 and the condenser lens 16 is mounted on the printed circuit board 12 with the light source 14 being arranged between the condenser lens 16 and the printed circuit board 12. The condenser lens 16 supports the image substrate 18 and the projector lens 20, wherein the projector lens 18 comprises a projection surface that engages the light exiting portion 110 of the housing 10.

For the projection optics lens stack 3 and the printed circuit board 12 allowing the logo lamp image substrate 18 to be adhered in place when assembled into the housing 10 of the logo lamp module 1 a resin 200 is applied on the top surface of the printed circuit board 12. As the housing 10 extends above the printed circuit board 12, the resin 200 is hold on the printed circuit board 12.

Further, a resin flow path 201 is provided such that the resin 200 can flow through the printed circuit board 12 and the condenser lens 16 to allow the resin 200 to touch the image substrate 18. For that purpose, a hole 202 is provided in the printed circuit board 12 and a funnel 204 is added on the projector lens 20. Thus, the resin 200 used to seal the logo lamp module 1 also fixes the image substrate 18, when the resin 200 cures.

In summary, the resin 200 extending from the top surface of the printed circuit board 12 to the top surface of the image substrate 18 seals and fixes the stack 3 within the housing 12. This allows for greater variation in assembly and appropriate clearances for automated assembly of components can be implemented without the risk of a rattle being present.

For example, the resin 200 may have a thixotropic character and may comprise a polyurethane resin. It may be drawn via gravity and capillary action through the hole 202 and the funnel 204 to reach the image substrate 18, that is to contact the upper surface of the image substrate 18 as shown in FIG. 2.

Further, the hole 202 within the printed circuit board 12 may have a height of 1 to 2 mm, e.g. around 1.6 mm, and the funnel 204 provided by the condenser lens 16 may have a height of 4 to 7 mm, e.g. around 5.3 mm. The cross section of the hole 202 may be substantially rectangular with rounded edges, in particular with a length of 3 to 5 mm, e.g. around 4 mm, and a width of 2 to 3 mm, e.g. around 2.8 mm. The radius of the edge may be in the region of 1 mm. The funnel 204 matches the geometry of the hole 202 at its upper edge and may taper towards its lower edge, for example with an angle of around 200 in the length direction and 10° in the width direction. The exact geometry depends on the selected resin 200.

Figure 3:
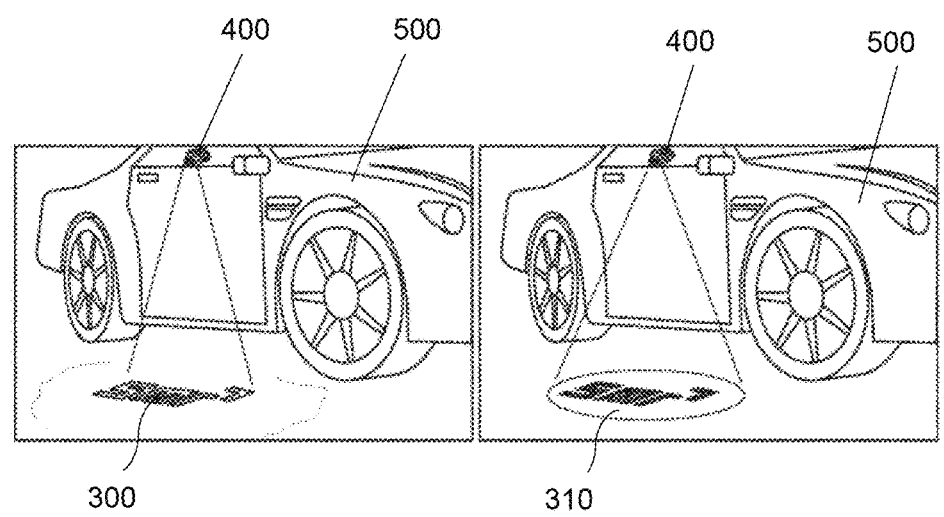
FIG. 3 is a diagram illustrating a negative or positive image projected by the logo lamp module of FIGS. 1 and 2.

FIG. 3 is a diagram illustrating a negative image 300 and a positive image 310, respectively, projected by the logo lamp module 1 mounted to an external rear view assembly 400 of a motor vehicle 500. The negative image 300 shown left may increase the impact of the image whereas the positive image 310 shown right may fulfil the role of a courtesy lamp more effectively. It should be appreciated that the logo lamp module 1 may produce a negative or positive image according to a setting of the user and/or according to the image substrate 18 being used.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

REFERENCE SIGNS 1 logo lamp module
3 projection optics lens stack
10 housing
12 printed circuit board
14 light source
16 condenser lens
18 image substrate
20 projector lens
110 light exiting portion
112 stack holding portion
200 resin
201 resin flow path
202 hole for resin
204 funnel for resin
300 negative image
310 positive image
400 external rear view assembly
500 motor vehicle

The invention claimed is:

1. A logo lamp module for an external rear view assembly of a motor vehicle, comprising:
   a projection optics lens disposed within a stack holding portion of a housing closed by a printed circuit board,
   the projection optics lens stack comprising a logo sheet or image substrate between at least one first lens and at least one second lens, wherein the at least one first lens is disposed between the printed circuit board and the logo sheet or image substrate, and the at least one second lens is disposed between the logo sheet or image substrate and a light exiting portion of the housing,
   wherein a flow path is defined by a hole through the printed circuit board and a funnel in the at least one first lens, such that a resin or adhesive applied on an outer surface of the printed circuit board contacts a surface of the logo sheet or image substrate facing the at least one first lens to seal a connection of the printed circuit board and the housing as well as to fix the logo sheet or image substrate within the housing.

2. The logo lamp module of claim 1, wherein the housing comprises
   a first attachment means for attachment to the external rear view assembly,
   a second attachment means for attachment of the printed circuit board, and
   a third attachment means for attachment of the projection optics lens stack.

3. The logo lamp module according to claim 2, wherein the third attachment means comprises
   a first third attachment means for engaging the logo sheet or image substrate and/or the at least one second lens, and/or
   a second third attachment means for engaging the at least one second lens.

4. The logo lamp module according to claim 3, wherein the first third attachment means is provided by the stack holding portion, and/or
   the second third attachment means is provided by the light exiting portion.

5. The logo lamp module according to claim 1, wherein the light exiting portion comprises
   a disk like lens portion, and
   a stem portion extending from the disk like lens portion.

6. The logo lamp module according to claim 5, wherein the stem portion is comprised by the second third attachment means.

7. The logo lamp module according to claim 1, wherein the printed circuit board comprises a power connector and an electronic circuit, and/or
   the at least one light source is mounted on the printed circuit board, and/or
   the at least one first lens is mounted on the printed circuit board encasing the light source.

8. The logo lamp module according to claim 1, wherein the at least one first lens engages the logo sheet or image substrate, and/or
   the at least one first lens comprises a condenser lens.

9. The logo lamp module according to claim 1, wherein the at least one second lens engages the light exiting portion and/or the stack holding portion, and/or
   the at least one second lens comprises a projector lens.

10. The logo lamp module according to claim 1, wherein the hole is arranged in an edge portion of the printed circuit board, and
    the funnel is arranged in an edge portion of the at least one first lens,
    wherein the hole and the funnel are aligned to each other and/or are arranged in a region of engagement of the printed circuit board and the at least one first lens.

11. The logo lamp module according to claim 1, wherein the flow path is offset relative to the light exiting portion, and/or the flow path is dimensioned to draw the resin or adhesive via gravity and capillary action to make contact with the logo sheet or image substrate.

12. The logo lamp module according to claim 1, wherein the resin or adhesive comprises a polyurethane resin and/or has a thixotropic character.

13. An external rear view assembly for a motor vehicle comprising the logo lamp module according to claim 1.

14. A motor vehicle comprising the external rear view assembly of claim 13.

* * * * *